United States Patent [19]

Steer

[11] Patent Number: 4,630,443
[45] Date of Patent: Dec. 23, 1986

[54] RESERVOIR FOR A MASTER CYLINDER

[75] Inventor: John E. Steer, South Bend, Ind.

[73] Assignee: Allied Corporation, Morristown, N.J.

[21] Appl. No.: 740,668

[22] Filed: Jun. 3, 1985

[51] Int. Cl.$^4$ .............................................. F15B 7/00
[52] U.S. Cl. .......................................... 60/535; 60/592;
73/317; 116/229; 200/84 C; 220/306; 220/308;
220/355; 220/358
[58] Field of Search ................. 60/534, 535, 585, 592;
340/52 C; 200/84 C, 84 R, 81.9 M; 220/306,
307, 308, 355, 358; 73/317, 308, 309; 116/229

[56] References Cited

U.S. PATENT DOCUMENTS

| | | | |
|---|---|---|---|
| 3,023,924 | 3/1962 | Boyer | 60/585 |
| 3,479,068 | 11/1969 | Brittain | 60/585 |
| 3,618,802 | 11/1971 | Yates, Jr. | 220/308 |
| 4,001,644 | 1/1977 | Lingenfelter et al. | 73/308 |
| 4,084,377 | 4/1978 | Gaiser | 60/535 |
| 4,170,877 | 10/1979 | Pickering | 60/592 |
| 4,198,824 | 4/1980 | Nogami et al. | 60/535 |
| 4,297,846 | 11/1981 | Cadeddu | 60/592 |
| 4,407,125 | 10/1983 | Parsons | 60/592 |
| 4,489,224 | 12/1984 | Steer | 200/84 C |
| 4,505,113 | 3/1985 | Reinartz et al. | 60/592 |

FOREIGN PATENT DOCUMENTS 47118  4/1979  Japan .................................... 60/592

Primary Examiner—Abraham Hershkovitz
Attorney, Agent, or Firm—Leo H. McCormick, Jr.; Ken C. Decker

[57] ABSTRACT

A reservoir (20) for a master cylinder (16) has a body (22) with an end member (82) attached thereto by tangs (92, 92' . . . 92$^N$) that engage a surface (69) on a flange (70). A shoulder (86) concentric to peripheral lip (84) on the end member (82) retains a seal (96). A projection (90) that extends from the end member (82) acts as a stop to assure that a pin (52) on a lever (54) that carries a magnet (60) remains attached to arms (44) extending from the body (22). While motion may move the fluid in compartments (34 and 36) toward flange 70, shoulder (86) acts a first barrier and seal (96) acts as a second barrier to prevent fluid from leaking through the mechanically formed joint. If fluid is lost from the compartments (34 and 36) a float (58) tracks the fluid level and moves magnet (60) toward sensor (64) to inform an operator of the change in fluid level.

3 Claims, 3 Drawing Figures

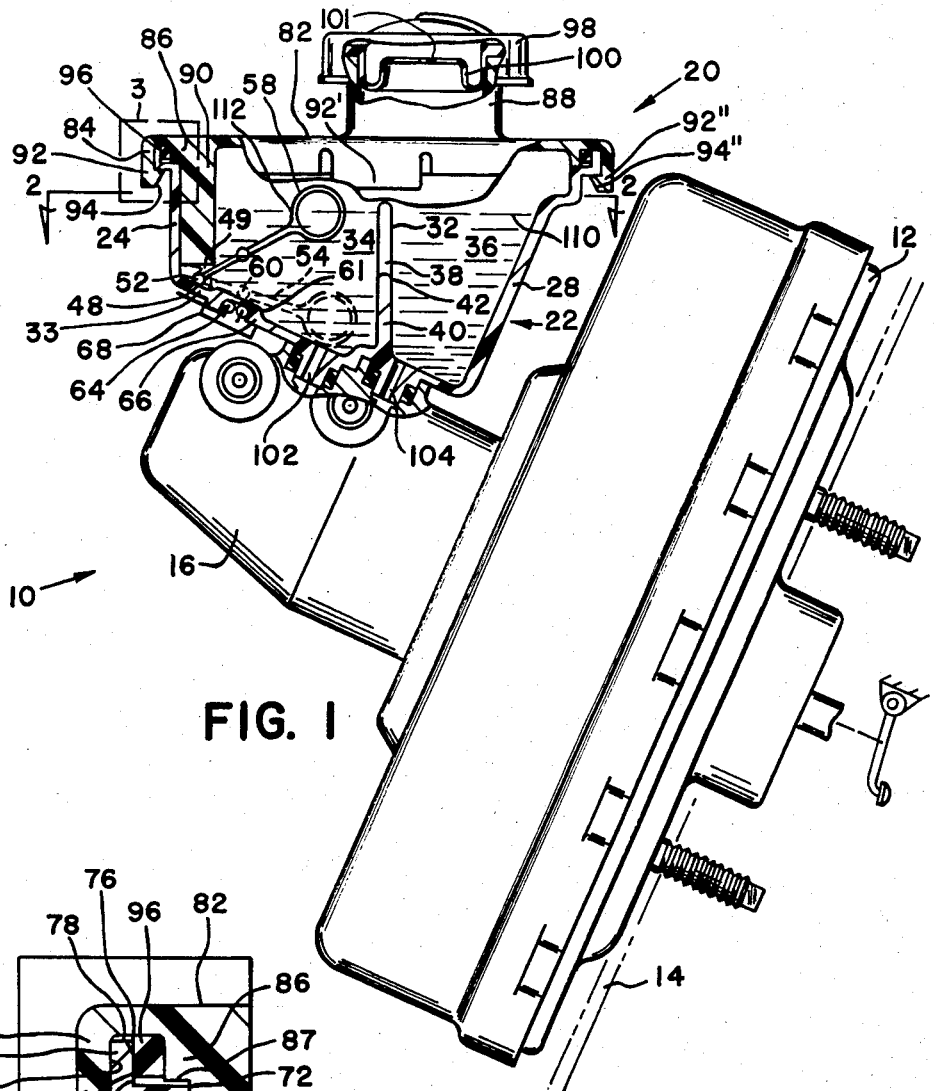
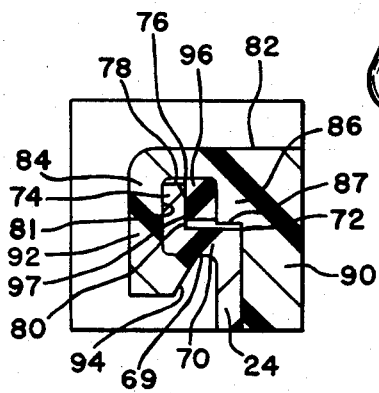
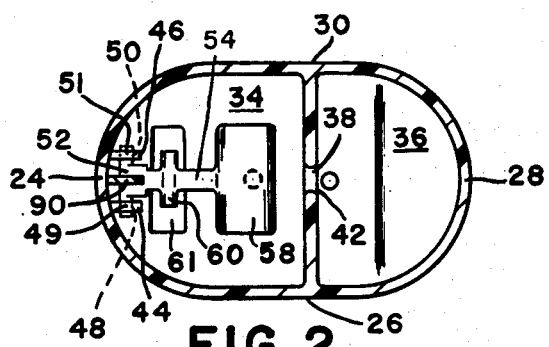

RESERVOIR FOR A MASTER CYLINDER

This invention relates to a reservoir for a master cylinder wherein an end member is attached to a plastic body by a tang extending from a peripheral surface. A seal retaining shoulder located adjacent a flange on a body forms a first barrier while a seal engages a peripheral lip extending from the flange to prevent fluid from being lost from the reservoir.

Initially all covers were filler caps that were attached to a housing by threaded connections such as disclosed in U.S. Pat. No. 3,068,651. Unfortunately, the threads could be damaged by an operator on replacing the cap after checking the level of brake fluid. Unless the cap is completely tight against the housing, a leak path can occur to the surrounding environment for brake fluid. Thereafter, it was decided that an effort should be made to reduce the possibility of damaging the sealing components of the cover. It was suggested that the cover could be made of a plastic member which snapped onto the housing of the master cylinder reservoir, such as disclosed in U.S. Pat. No. 3,077,283. Even though this type of cover is more economical to produce, because of the coefficient of expansion for the metal master cylinder reservoir housing and the plastic cover during extreme temperature changes, it is not completely acceptable since it is possible under some conditions to create stress cracks in the cover that would permit a fluid leak path. It became apparent that a lock such as disclosed in U.S. Pat. No. 3,317,079, would be necessary to assure that the reservoir was sealed from the environment under all operating conditions. Unfortunately, because of space problems such locking structure cannot be used on all vehicles. Thus, covers were again attached to the reservoir housings through bolts such as disclosed in U.S. Pat. No. 3,344,944. This type of attachment is completely adequate, however, a simpler method of attachment was desired and as a result, the bail wire structure such as disclosed in U.S. Pat. No. 3,944,131 was developed. The bail wire type attachment structure is currently used on the majority of master cylinders used on vehicles manufactured in the Unites States.

In an effort to reduce the cost of manufacturing a reservoir, it has been suggested that the reservoir be made of two parts and then welded together to produce a reservoir such as illustrated in U.S. Pat. No. 4,489,224. During the manufacture of such reservoirs it is necessary that each reservoir be checked for leaks by plugging the various openings and pressurizing the system. If a bad or weak weld has been produced, the pressure level should drop within a set time to indicate the existance of a potential leak path between the top and bottom parts. Unfortunately, the cost of such test equipment and time required to check each plastic reservoir adds considerable cost to the selling price of each reservoir.

The present invention provides a reservoir made of two pieces that are joined together to produce a sealed joint in a plane above a normally operational fluid level. The reservoir has a body having side walls with a flange located on its periphery. The flange has a lip that extends from an annular ledge. An end member has a peripheral lip with a concentric shoulder located thereon. A vent tube extends upward and a projection extends downward from the end member. A lever which has a pin on a first end and a float on the other end carries a magnet. The pin is attached to arms extending from a side wall. A seal carried on the concentric shoulder is aligned with the lip on the flange. Tangs that extend from the flange, radially expand outwardly to allow the shoulder to move toward the flange while at the same time compressing the seal between the lip and shoulder. When the shoulder engages the flange, the tangs radially contract to lock the end member to the body. The shoulder forms a first barrier to retain fluid in the reservoir while at the same time, the compressed seal forms a second barrier to retain fluid in the reservoir. Since the flange is above the normal fluid level in the reservoir, the two barrier retension system eliminates the need to weld the end member to the body. Should the fluid in the reservoir be depleted, the float follows the fluid level and moves the magnet toward a flat surface on the base of the body. As the magnet approaches the flat surface, a sensor located in a groove on the outside of the base is provided with a signal indicative of the fluid level in the reservoir.

In operation the fluid in the body produces waves that move the float. The projection on the end member engages the pin on the level to assure that movement of the float by the fluid doesn't displace the pin from the arms on the side wall. When a low fluid level is reported by the sensor, a cap on the vent tube may be removed and fluid added to the reservoir.

An advantage of this reservoir occurs through the manufacture of individual body and an end member which are later mechanically joined together.

It is an object of this invention to provide a reservoir for a master cylinder having an end member which has a shoulder that is positioned adjacent a flange to define a first barrier and a seal located between the shoulder and a lip on the flange forms a second barrier to retain fluid in a compartment.

It is a further object of this invention to provide a reservoir with an end member having a vent tube through which fluid is added to the reservoir and a projection that extends into the reservoir to assure that a pin on a lever of a sensor is retained on arms attached to the side wall of the reservoir as a float on the lever tracks the fluid level and a magnet on the lever remains in alignment with a sensor that informs an operator of the fluid level.

These advantages and objects should be apparent from reading the specification while viewing the drawings wherein:

FIG. 1 is a schematic illustration of a power brake booster apparatus having a master cylinder with a reservoir made according to the principals of this invention;

FIG. 2 is a view taken along line 2—2 of FIG. 1; and

FIG. 3 is an enlarged view of the circumscribed area 3 in FIG. 1.

The brake system 10 shown in FIG. 1 has a power assist booster 12 attached to the fire wall 14 of a vehicle and a master cylinder 16 that extends into the booster 12 to form a compact unit. The master cylinder 16 is connected by lines to the front and rear brakes of a vehicle.

The mounting angle of the brake booster 12 with respect to the fire wall 14 is such that the master cylinder 16 is located in an incline plane with respect to a horizontal plane. In vehicles with cross-mounted engines, this inclined plane mounting is necessary to avoid interfering with the operation of the transmission. The master cylinder 16 is of the type disclosed in U.S. Pat. No. 4,559,781 filed Oct. 31, 1983 wherein stamped pistons nestle into each other to reduce the overall length of the master cylinder 16.

The master cylinder 16 has a reservoir 20 attached thereto through which fluid is supplied to the brake system 10.

The reservoir 20 has a body 22 made of a molded plastic. The body 22 has side walls 24, 26, 28 and 30 which are attached to a base 33. An interior wall 32 divides the interior of body 22 into a first compartment 34 and a second compartment 36. An opening 38 in the interior wall 32 allows fluid to be communicated between the first and second compartments as long as the fluid level is above a solid wall 40. The base 33 is parallel to the master cylinder 16 and when the fluid level reaches the top 42 of wall 40, a fixed amount of fluid of substantially equal volume remains in both compartments 34 and 36.

A pair of arms or brackets 44 and 46, each of which has an opening 48 and 50 respectively, are attached to side wall 24.

Slots 49 and 51 expand to allow pin 52 attached to lever 54 to be placed in openings 48 and 50 in brackets 44 and 46. Lever 54 has a float 58 on the end opposite the pin 52 and a magnet 60 encapsulated therein between the pin 52 and float 58. Float 58 tracks the fluid level in compartment 34 and when the fluid level falls below point 42, magnet 60 provides a sensor 64 with a signal representative of such fluid level. The sensor 64 is located in a groove 66 on the outside of the base 33. The sensor 64 is also encapsulated in groove 66 by a cover 68 that protects the sensors 64 from being damaged.

As best shown in FIG. 3, body 22 has a flange 70 that extends around the periphery of the side walls 24, 26, 28 and 30. Flange 70 has a ledge 72 that is offset from the side wall 24 and a peripheral lip 74 that extends therefrom. The lip 74 has a beveled surface 76 which connects surface 78 with surface 80. An end member 82 has a peripheral lip 84, a concentric shoulder 86, a vent tube 88 and a projection 90 that are integrally formed on a relatively flat substantially oval body. As seen in FIGS. 1 and 2, tangs 92, 92' . . . 92$^N$ extend from the peripheral lip 84. Tangs 92, 92' . . . 92$^N$ each have a corresponding barb 94, 94' . . . 94$^N$ on the end thereof.

A seal 96 is resiliently placed on shoulder 86 and the end member 82 joined to the body 22 as follows:

Projection 90 is aligned over pivot pin 52. Seal 96 is larger than the dimension between shoulder 86 and surface 80 on lip 74 and therefor it must be compressible. A lubricant may be applied to beveled surface 76 and surface 80 to aid in moving seal 96 toward ledge 72. Barbs 94, 94' . . . 94$^N$ on tangs 92, 92' . . . 92$^N$ radially expand over surface 81 on lip 74 to allow the edge 97 of seal 96 to engage the beveled edge 76. Further movement of the end member 82 toward flange 70 compresses seal 96 between surfaces 80 and shoulder 86 to define an air tight barrier. When the top 87 of shoulder 86 engages ledge 72 of flange 70, tangs 92, 92' . . . 92$^N$ rotate inwardly to position barbs 94, 94' . . . 94$^N$ on surface 69 and thereby lock the end member 82 to the body 22.

Cap 98 and diaphragm 100 are attached to the vent tube 88 to complete the assembly of the reservoir 20.

In operation, cap 98 and diaphragm 100 are removed from the vent tube 88 and fluid added to compartments 34 and 36. Float 58 pivots on pin 52 to move magnet 60 away from sensor 64.

In order to bleed the brake lines in the system of air, a vacuum apparatus is applied to vent tube 88. This vacuum draws seal 96 against surface 72 and shoulder 86 to prevent air from entering compartments 34 and 36 and allow any air in the brake system to be removed by being communicated through compensator ports 102 and 104 that connect compartments 34 and 36 to the operational chambers in the master cylinder 16.

After the air is removed from the brake system, fluid is forced into the brake system through vent tube filling the evacuated system. Thereafter, diaphragm 100 and cap 98 are placed on vent tube 88.

As shown in FIG. 1, the normal fluid level is indicated by line 110. Opening 38 in wall 32 allows the fluid to freely flow between compartments 34 and 36. Float 58 is in the position shown by line 112 and as such sensor 64 remains in an off position to inform an operator of this condition.

Motion of the vehicle causes the fluid in the compartments to move or cause waves. Shoulder 86 forms a first barrier that retains the fluid in compartments 34 and 36, and seal 96 forms a second barrier to assure that the fluid is not lost through the connection of the end member 82 and body 22.

Over a period of time, fluid may be lost from the brake system, most commonly at the wheel cylinders. Fluid lost from the system is added thereto by flowing through compensator ports 102 and 104 into the operational chambers in the master cylinder 16. Until the volume of lost fluid exceeds the volume of fluid retained in compartments 34 and 36 above the top 42 of wall 40, fluid freely flows between these compartments. As more fluid is communicated from compartment 34, float 58 pivots on pin 52 to move magnet 60 toward flat surface 61. The approach of magnet 60 toward sensor 64 produces a signal indicative of the fluid level in the reservoir 20 to inform an operator that fluid should be added to the system. As the fluid level 110 changes, slit 101 in diaphragm 100 allows air to enter chambers 34 and 36 to maintain the fluid pressure therein at approximate atmospheric pressure.

I claim:

1. A reservoir for a master cylinder of a brake system, said reservoir consisting of:

a body having side walls connected to a base member, said body having an interior wall that separates a first compartment from a second compartment, said interior wall having an opening located a fixed distance from said base to permit communication of fluid between said first and second compartments while assuring a minimum volume of fluid is retained in each of said first and second compartments, said base member having first and second ports therein for connecting said first and second compartments with first and second chambers within said master cylinder, said side walls having a flange with a first peripheral lip located thereon, said body having first and second arms extending from one side into said first compartment, said base member having an external slot with a corresponding internal flat surface located in said first compartment;

a lever having a pin on a first end, a float attached to a second end and a magnet positioned between said first and second ends, said pin being attached to said first and second arms, said float being responsive to the level of fluid in said first compartment by pivoting said lever about said first end and positioning said magnet within said first compartment;

sensor means located in said external slot and responsive to the position of said magnet for generating a signal indicative of the fluid level in said first compartment;

an end member having a vent tube extending therefrom, said end member having a second peripheral lip with a corresponding shoulder located adjacent thereto to define a groove, said end member having a projection extending from said shoulder into said first compartment, said projection having an end surface that assures that said pin is retained in said first and second arms on movement of said lever by said float;

a seal resiliently retained on said shoulder in said groove on said end member;

a cap connected to said vent tube through which fluid is supplied to said first and second compartments; and a plurality of tangs extending from said second peripheral lip on said end member, said tangs initially radially expanding to allow said first peripheral lip to be located in said groove and when said shoulder engages said flange to radially contract and lock said end member to said body, said shoulder and flange first forming a first mechanical barrier and the compression of said seal between said shoulder and first peripheral lip forming a second mechanical barrier to retain fluid in said first and second compartments, said base member being located in a plane that forms an acute angle with said end member, said float following the level of fluid in first and second chambers and when the float is below the opening in said interior wall, positioning said magnet with respect to said flat surface to provide said sensor means with a signal indicative of the fluid level in said first compartment.

2. The reservoir as recited in claim 1, wherein said cap includes:

a diaphragm which seals the vent tube while allowing air to be communicated into said first and second compartments as the fluid level therein changes.

3. The reservoir as recited in claim 2, wherein said first peripheral lip includes:

a beveled section that allows said seal to be compressed and moved toward said flange without being damaged.

* * * * *